No. 786,215. PATENTED MAR. 28, 1905.
A. HEPNAR.
APPARATUS FOR TREATING ANIMAL COLICS OR GRIPES.
APPLICATION FILED JUNE 14, 1904.
2 SHEETS—SHEET 1.
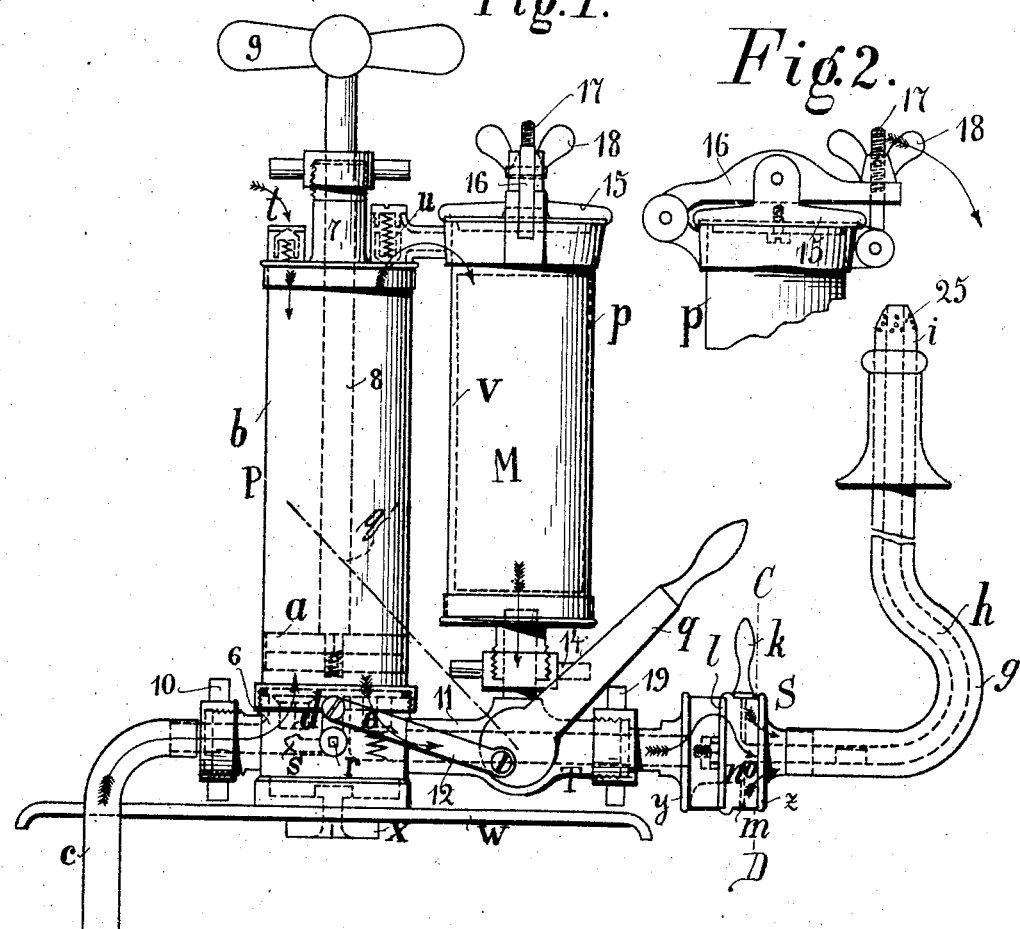
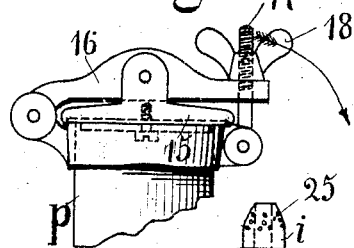
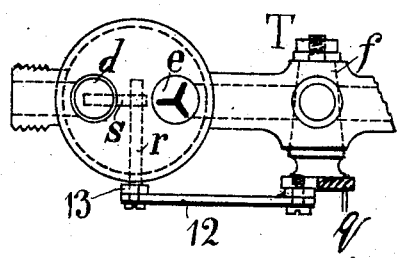

No. 786,215. PATENTED MAR. 28, 1905.
A. HEPNAR.
APPARATUS FOR TREATING ANIMAL COLICS OR GRIPES.
APPLICATION FILED JUNE 14, 1904.
2 SHEETS—SHEET 2.
Fig.3. Fig.4.
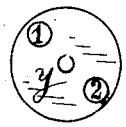 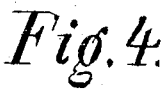
Fig.5. Fig.6.
 
Fig.7. Fig.8.
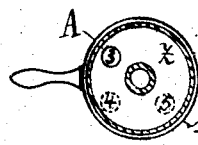 
Fig.9. Fig.10.
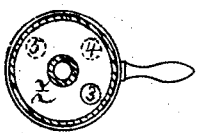
Fig.12.
Fig.13.
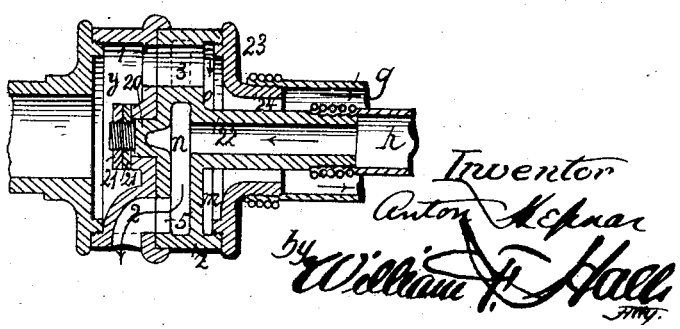
Attest Inventor
Anton Hepnar
F. R. Fitton by William F. Hall
Atty.

No. 786,215.

Patented March 28, 1905.

UNITED STATES PATENT OFFICE.

ANTON HEPNAR, OF CASSEL, GERMANY.

APPARATUS FOR TREATING ANIMAL COLICS OR GRIPES.

SPECIFICATION forming part of Letters Patent No. 786,215, dated March 28, 1905.

Application filed June 14, 1904. Serial No. 212,559.

*To all whom it may concern:*

Be it known that I, ANTON HEPNAR, a citizen of the Empire of Austria-Hungary, residing at Cassel, Province of Hesse-Nassau, in the Kingdom of Prussia, Germany, have invented certain new and useful Improvements in Apparatus for Treating Animal Colics or Gripes, of which the following is a specification, reference being had therein to the accompanying drawings.

My invention relates to a new apparatus for treating animal colics or gripes by evacuating the feces from the large intestine, filling the entrails with water mixed with curatives, and assisting the healing process by insufflating antiseptic gases.

The new apparatus essentially consists of a double-acting pump arranged for sucking and expelling water at the bottom and air at the top, a mixing vessel provided with a perforated box for drugs or medicaments and arranged for developing smoke or gases from the drugs or medicaments and mixing them with the air, a three-way cock for the passage of either the water or the mixture of air and smoke or gas, a device for opening the water-suction valve of the pump in case the mixture of air and smoke or gas is passed through the three-way cock, two hoses, one within the other, a mouthpiece to be introduced into the animal-anus, and a switching device for arbitrarily passing the water or the mixture of air and smoke or gas from the three-way cock to the animal-body through the internal hose or through the space between the two hoses, while allowing the dirty water or gases to return through the annular space between the two hoses or through the internal hose, respectively, and to escape or not allowing the same to escape.

I will now proceed to describe my invention with reference to the accompanying drawings, in which—

Figure 1 is an elevation of the whole apparatus, a part of the two hoses being omitted. Fig. 2 is a side view of the upper part of the mixing vessel seen in the direction from right to left in Fig. 1. Figs. 3 to 8, inclusive, show the two parts of the switching device in different positions and will be referred to later on. Fig. 9 is a cross-section of the plug of the three-way cock and shows its position when its lever $q$ occupies the position illustrated at Fig. 1. Fig. 10 shows the position of this plug on the lever $q$ occupying the other extreme position indicated by the dotted line at Fig. 1. Fig. 11 is a plan of the lower valve-box and the three-way cock, the pump and the mixing vessel being omitted and the lever $q$ shown in section. Fig. 12 is an elevation, on a reduced scale, of the folded base; and Fig. 13 is a longitudinal section, on an enlarged scale, through the switching device on the line A B in Fig. 7.

Similar characters of reference refer to similar parts throughout the several views.

The pump P comprises a bottom valve-box 6, a cylinder $b$, screwed thereon, a cover 7, and a piston $a$, which latter is connected with a rod 8 passing through the stuffing-box of the cover 7 and can be moved up and down by hand with the aid of the handle 9. The bottom valve-box 6 is preferably pivotally connected with a base formed of two plates $w$ and $x$, so that the whole apparatus can be turned around the vertical axis of the cylinder $b$. The base can be folded (see Fig. 12) to facilitate the transport of the apparatus. A water-suction hose $c$ can be attached to the bottom valve-box 6 by means of a threaded coupling 10 of any known construction. The bottom valve-box 6 comprises two separate chambers for the suction-valve $d$ and the delivery-valve $e$, which latter is shown to be pressed upward on its seat by a suitable spring. The cover 7 is provided with a spring-pressed air-suction valve $t$ and a spring-pressed air-delivery valve $u$.

The three-way cock T comprises a casing 11, a plug $f$, and a lever $q$. The casing 11 is shown as cast in one piece with the bottom valve-box 6, and its left passage in Fig. 1 communicates with the chamber of the delivery-valve $e$, already mentioned above. The nave of the lever $q$ is pivotally connected by a rod 12 with a lever 13, fastened on a shaft $r$ in the bottom valve-box 6. On this shaft $r$ is affixed a lever $s$, which is adapted to open the suction-valve $d$ on turning the lever $q$ from the right position (shown at Fig. 1) to the left position, (indicated by the dotted line.)

The mixing vessel M is screwed on the three-way cock T by means of a threaded coupling 14 of any known construction. It comprises a cylinder $p$, a perforated box or receptacle $v$, and a cover 15, which latter is hinged to a lever 16 and can be closed by means of a pivoted bolt 17 and a thumb-nut 18. The lever 16 is forked at its free end to permit the bolt 17 to engage in its recess. After unscrewing the thumb-nut 18 and turning downward the bolt 17 in the direction of the arrow the cover 15 can be turned upward to open the cylinder $p$. Preferably the cover 15 is provided with a suitable packing-disk for tightening the cylinder. The upper part of the cylinder $p$ communicates with the chamber of the air-delivery valve $u$, already referred to above. The perforated box or receptacle $v$ may be left open at the top and is arranged for containing the medical drugs or the like from which smoke or gases are to be developed by burning or otherwise.

The switching device S, with the double hose, can be attached to the three-way cock T by means of a threaded coupling 19 of any known construction. This device consists of of two members $y$ and $z$, connected by a pivot 20 and two nuts 21 21, so that the one member, $z$, provided with a handle $k$, can be turned on the other member, $y$, around a horizontal axis. The member $y$ is hollow and communicates with the right passage of the three-way cock T in Fig. 1. On the face in contact with the member $z$ the member $y$ is provided with two holes 1 and 2, (see Figs. 3 and 5,) of which the one 1 leads to its cavity and the other hole, 2, to without, as is clearly shown at Fig. 13. The member $z$ is divided by a partition-wall $m$ into two chambers $n$ and $o$, of which the one, $n$, communicates with two holes 4 and 5 on the face in contact with the member $y$, and the other chamber, $o$, communicates with the third hole 3. (See Fig. 13.) Fig. 4 represents the face of the member $z$ with the three holes 3, 4, and 5—$i. e.$, when looked at from left to right in Fig. 1. Figs. 6, 7, and 8 are cross-sections through the member $z$ on the line C D in Fig. 1 when looked at from right to left and show different positions of this member. The partition-wall $m$ is cast in one piece, with a central tubular piece 22, on which the one end of the internal hose $h$ is conveniently secured. The external cover 23 of the member $z$ is cast in one piece with a tubular piece 24, on which the one end of the external hose $g$ is conveniently secured. It will be seen that the chamber $n$ communicates with the internal hose $h$ and the chamber $o$ with the space between the two hoses $g$ and $h$. The other ends of these two hoses $g$ and $h$ are conveniently connected with a mouthpiece $i$. The latter has a central passage communicating with the internal hose $h$ and an annular space communicating, on the one hand, with the space between the two hoses $g$ and $h$, and, on the other hand, with a plurality of perforations 25, arranged in the conical end face. The mouthpiece $i$ can be introduced into the animal-anus.

The apparatus is operated as follows: After unfolding the base $w$ $x$ and putting up the pump P and the mixing vessel M on the soil or floor the suction-hose $c$ is inserted in the source of water and attached to the bottom valve-box 6. The member $z$ is placed in the convenient position—for example, by bringing its handle $k$ into the position shown at Fig. 7—so that the holes 3 and 5 of this member register with those 1 and 2, respectively, of the other member $y$, as is shown at Fig. 13. This means that the right passage of the three-way cock T in Fig. 1 is put into communication with the annular space between the two hoses $g$ and $h$, while the internal hose communicates, through the hole 2, with the atmosphere. The lever $q$ is brought into the position shown in full lines at Fig. 1, so that by the plug $f$ (see Fig. 9) the right passage is put into communication with the left passage—that is to say, with the pump P—while the suction-valve $d$ is relieved from the lever $s$. The handle 9 is moved up and down several times to suck water until water flows out of the mouthpiece $i$, when the latter is introduced into the animal-anus. On forcing downward the handle 9 water will pass through the annular space between the two hoses $g$ and $h$ into the large intestine and successively loosen and drive out the feces through the internal hose $h$ to without. Thus all objectionable dammings or pressures are avoided. The handle 9 may be moved up and down several times. Meanwhile the perforated box or receptacle $v$ is filled with drugs or other medicaments, either kindled or not, as the case may be, and introduced into the cylinder $p$, after which the cover 15 is closed. At a convenient moment the lever $q$ is turned to the left into the other position (indicated by the dotted line in Fig. 1) to place the right passage of the three-way cock T into communication with the mixing vessel M (see Fig. 10) and to check the delivery of water by opening the suction-valve $d$. On forcing the handle 9 downward air will enter the cylinder $b$ through the inlet-valve $t$, and on moving upward the handle 9 this air will pass through the opened delivery-valve $u$ and the drugs or the like in the box $v$ and mix with the smoke or gases, while in the former case entertaining the combustion. This mixture passes through the three-way cock T and the space between the two hoses $g$ and $h$ into the entrails, where the smoke or gases will act antiseptically or stimulate the healing process, respectively, as the case may be. If it is desired to prevent smoke or gases from escaping through the hole 2, the member z is so turned as to bring its handle k into the vertical position, (see Figs. 4 and 6,) so that the hole 4 of the member z registers with that 1 of the other member y, while all the other holes, 3, 5, and 2, remain covered. Then the mixture of air and smoke or gas passes through the internal hose h to the animal-body and is allowed to exert its influence. From time to time, if so desired, the lever q may be reversed to turn on the water. When so preferred, the member z may be so turned as to bring its handle k into the opposite horizontal position, (shown at Fig. 8,) when its holes 5 and 3 will register with those 1 and 2, respectively, of the member y. This means that the water or the mixture of air and smoke or gas will now pass through the internal hose h to the animal-body and return through the perforations 25 of the mouthpiece i and the space between the two hoses g and h to without through the hole 2.

It is obvious that the manner of operating the apparatus or treating the animal will have to depend upon the circumstances and must be left to the judgment of the veterinary.

The apparatus described so far may be varied in many respects without deviating from the spirit of my invention.

What I claim as my invention, and desire to secure by Letters Patent, is—

1. The combination with a pump arranged for sucking and expelling water at the one end and air at the other end, of a mixing vessel connected with the air delivery of said pump and arranged for developing smoke or gases from drugs or medicaments and mixing same with the air, two hoses one within the other, a mouthpiece connected with said two hoses and adapted to be introduced into an animal-anus, and means for arbitrarily turning on the water from said pump or the mixture of air and smoke or gas from said mixing vessel to the internal hose or to the space between said two hoses and either allowing the dirty water or gases to return from the large intestine through the space between said two hoses or through the internal hose respectively to without or not.

2. In an apparatus for treating animal colics or gripes, the combination with a pump arranged for sucking and expelling water at the one end and air at the other end, of a mixing vessel connected with the air delivery of said pump and arranged for developing smoke or gases from drugs or medicaments and mixing same with the air, two hoses one within the other, a mouthpiece connected with said two hoses and adapted to be introduced into the animal-anus, a switching device connected with the other ends of said two hoses, and a three-way cock adapted to conduct either the water from said pump or the mixture of air and smoke or gas from said mixing vessel to said switching device, the latter being adapted to turn on the water or mixture either to the internal hose or to the space between said two hoses while either allowing the dirty water or gases from the large intestine to return through the space between said two hoses or the internal hose respectively or not.

3. In a portable apparatus for treating animal colics or gripes, the combination with a folding base, of a vertical hand-pump on said folding base and arranged to suck and expel water at the bottom and air at the top, a vertical mixing vessel connected at the top with the air delivery of said vertical hand-pump, a three-way cock connected with the water delivery of said vertical hand-pump and with the bottom of said vertical mixing vessel, a perforated box in said vertical mixing vessel for containing drugs or medicaments, a switching device connected with the outlet of said three-way cock, two hoses one within the other and connected with said switching device, and a mouthpiece connected with the other ends of said two hoses and adapted to be introduced into the animal-anus.

4. In a portable apparatus for treating animal colics or gripes, the combination with two plates forming a folding base, of a water-valve box on said folding base and comprising two chambers for an inlet-valve and an outlet-valve, a suction-hose attached to said water-valve box by a threaded coupling, a vertical cylinder on said water-valve box, a piston therein, a cover on said cylinder and comprising a stuffing-box, an air-inlet valve and an air-delivery valve on said cover, a piston-rod passing through said stuffing-box and adapted to be moved by a handle, a vertical mixing-cylinder connected at the top with said air-delivery valve, a three-way cock connected with the outlet-valve chamber of said water-valve box and with the bottom of said vertical mixing-cylinder, a lever connected with the plug of said three-way cock, means controlled by said lever for opening and releasing the inlet-valve in said water-valve box, a switching device connected with said three-way cock, two hoses one within the other and connected with said switching device, a mouthpiece connected with the other ends of said two hoses and adapted to be introduced into the animal-anus, a cover adapted to close and open said vertical mixing-cylinder, and a perforated box within said vertical mixing-cylinder and adapted to contain drugs or medicaments.

5. In a portable apparatus for treating animal colics or gripes, a switching device comprising a stationary member and a turnable member in contact with each other, said stationary member being provided in the contact-face with two holes on opposite sides of the center, of which the one hole leads to the three-way cock and the other hole through a lateral passage to without, said turnable member being provided in the contact-face with three holes at ninety degrees from each other and adapted to register severally with either or both of said two holes of said stationary member, a handle on said turnable member, a partition-wall dividing said turnable member into two chambers, of which the one communicates on the one hand with two of said three holes and on the other hand with a central tubular piece integral with said partition-wall and the other chamber communicates on the one hand by a passage with the third of said three holes and on the other hand with the annular space around said tubular piece.

In testimony whereof I have affixed my signature in presence of two witnesses.

ANTON HEPNAR.

Witnesses:
HANS HEDERICH,
HERMANN KIELHORN.